UNITED STATES PATENT OFFICE.

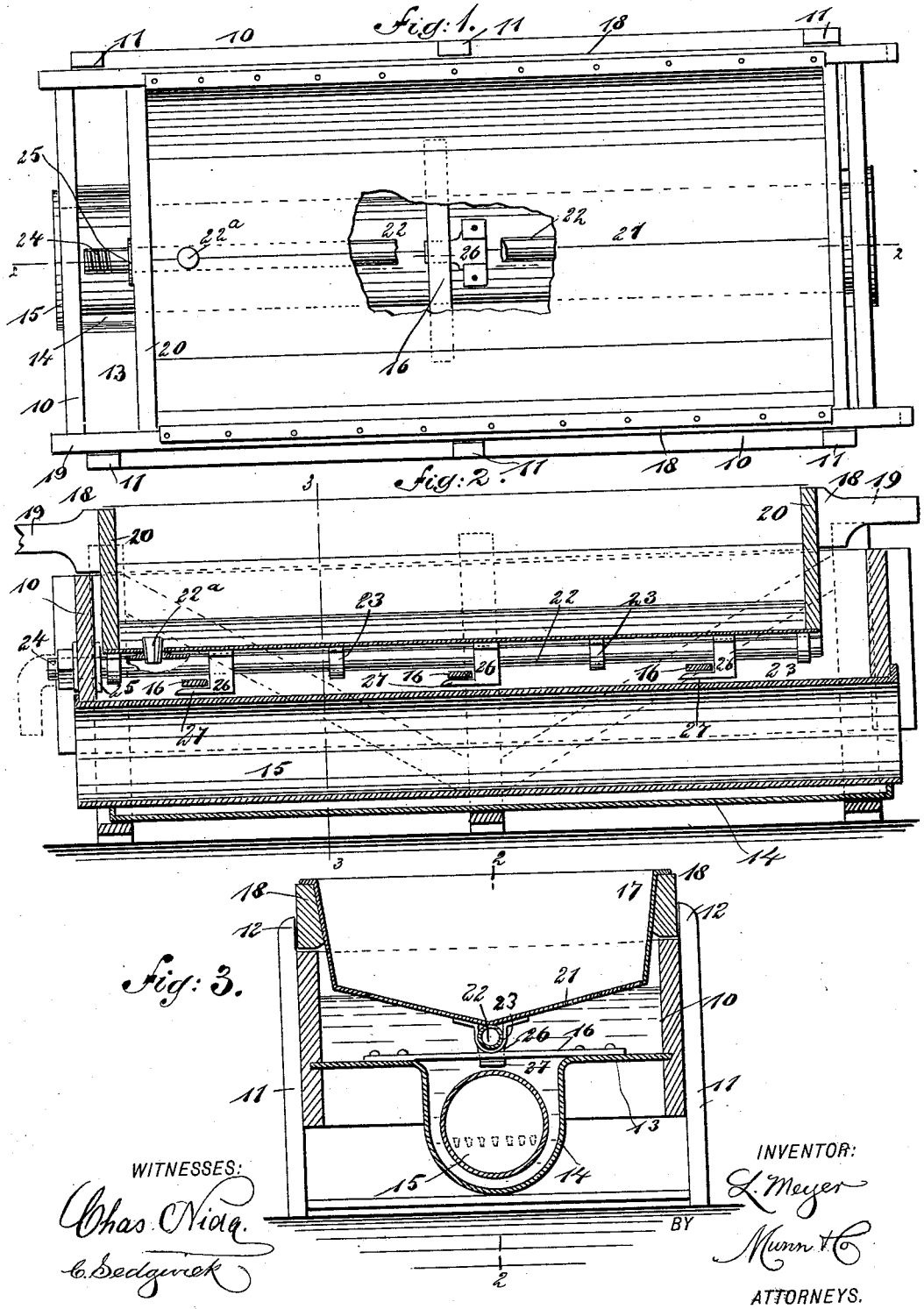

LEOPOLD MEYER, OF AHNAPEE, WISCONSIN.

CHEESE-VAT.

SPECIFICATION forming part of Letters Patent No. 478,880, dated July 12, 1892.

Application filed February 24, 1892. Serial No. 422,598. (No model.)

*To all whom it may concern:*

Be it known that I, LEOPOLD MEYER, of Ahnapee, in the county of Kewaunee and State of Wisconsin, have invented a new and Improved Cheese-Vat, of which the following is a full, clear, and exact description.

My invention relates to improvements in cheese-vats. These vats are usually provided with a water-tank, a heater for the same, and a removable milk-vat adapted to be suspended upon the water-tank, so as to heat the milk.

The object of my invention is to improve the construction of vats of this character, so as to strengthen the bottom of the sheet-metal milk-vat and at the same time provide a convenient means for drawing off the whey from the curds, to provide a simple and positive means of fastening down the milk-vat, so that its bottom will not bulge up when the weight of the whey is removed, and in general to construct and arrange the various parts of the tank and vat so that the tank and vat may be easily separated and operated and easily kept clean, to the end that good wholesome cheese may be manufactured to advantage.

With these ends in view my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a broken plan view of the apparatus embodying my invention. Fig. 2 is a broken longitudinal section of the same on the lines 2 2 in Figs. 1 and 3, and Fig. 3 is a transverse section on the line 3 3 in Fig. 2.

The water-tank 10 is substantially of the usual construction, being open at the top and being supported upon the legs 11, the upper ends 12 of which project above the sides of the tank, so as to form guides and stays for the milk-vat. The tank 10 has a metallic bottom 13, the middle portion of which is bent downward to form a deep longitudinal pocket 14, extending through which is the usual form of heating-cylinder 15, the ends of which are secured water-tight in the tank, and in this heating-cylinder a fire is built to heat the water in the tank, and consequently the milk above it. Extending across the pocket 14 are bars 16, which serve to strengthen the bottom, and which also act as stops for the milk-vat 17 and are adapted to engage the hooks on the bottom of the milk-vat, as described below. The milk-vat 17 is provided with narrow side pieces 18, the ends of which are formed into handles 19 to enable the vat to be easily removed from the tank, and the side pieces are connected near the ends by the end pieces 20, the side pieces and end pieces thus forming a supporting-frame for the vat proper, and the side pieces 18 rest upon the edges of the sides of the tank 10 and against the top portions 12 of the legs 11. The vat proper—that is, the middle portion of the vat—is formed in the usual way of sheet metal, generally tin, which is secured to the side pieces and end pieces 18 and 20 and which has a concave bottom 21, adapted to extend downward into the water of the tank 10, so that when the water is heated the milk in the vat will also be heated. The vat is made somewhat shorter than the tank, so that it may slide thereon, thus enabling it to be fastened to or detached from the tank.

In vats as generally constructed the whey is dipped from the vat, and when a portion of the whey is removed the metallic bottom of the vat is liable to bulge upward, so as to render entire separation of the whey and curds practically impossible, and the vat is also likely to ride up on the water in the tank. To obviate these difficulties the mechanism described below is employed. A pipe 22 extends longitudinally of the vat, on the under side of the same and near the center, the pipe being secured thereto by straps 23, and the pipe serves as a strengthening-rib to stiffen the vat. It also prevents it from bulging, and it further acts as a drain-pipe, as it is connected with the vat through an opening near one end of the latter, the opening being kept closed, usually, by a removable plug 22ª. The pipe 22 projects from one end of the vat, as shown in Figs. 1 and 2, and the projecting end is screw-threaded, as shown at 24. The pipe is also provided with a collar 25 adjacent to this screw-threaded portion, and when the pipe is pushed through an opening in the end of the tank 10 the collar by abutting with the end of the tank prevents the water from running out through the hole. In some cases a jam-nut is necessary; but whenever it is necessary a nut may be secured to the outer end of the pipe, as shown in Fig. 2, so as to draw the collar 25 firmly against the end wall of the tank. A pipe may be coupled to the outer end of the pipe 24, so that the whey may be conducted to any convenient point outside of the building. At intervals on the under side of the vat are hooks 26, having forwardly-extending arms 27, which are adapted to project beneath the cross-bars 16, which are secured to the floor of the water-tank.

It will thus be seen that to remove the vat it is only necessary to slide it so that the arms 27 will not extend beneath the cross-bars and that to lock it in place it is only necessary to push the vat so that the arms will extend beneath the cross-bars, and when in this latter position it will be understood that the vat cannot by any possibility rise.

The apparatus is used and operated as follows: The tank 10 is partially filled with water, a fire is kindled in the cylinder 15 to heat the water to the required temperature, the plug 22ª is placed in the opening leading from the vat to the pipe 22, the vat is placed in the tank and pushed forward, so that the arms 27 will extend beneath the cross-bars 16, the milk is placed in the vat, and when heated to the right temperature the rennet is added, and when the curds are formed they are worked to one side, the plug 22ª removed, and the whey allowed to pass off through the pipe 22. The vat may then be pushed back and lifted from the tank.

Having thus described my invention, I claim as new and desire to secure by Letters Patent—

1. In a cheese-vat, the combination, with a water-tank, of a milk-vat fitted to slide on the tank and provided with a discharge-pipe on the under side of its bottom, said pipe projecting beyond the end of the vat and entering an aperture in one end of the water-tank, substantially as described.

2. In a cheese-vat, the combination, with a water-tank, of a milk-vat having a sliding and detachable connection with the tank and provided with a discharge-pipe extending longitudinally along the under side of its bottom and having its end projecting beyond the end of the vat, said projecting end entering an aperture in one end of the tank when the vat is secured to the tank, substantially as described.

3. The combination, with the water-tank having a hole in one end, of the milk-vat slidably mounted upon the tank and a longitudinal discharge-pipe secured to the under side of the milk-vat and adapted to project through a hole in the water-tank, said pipe having a collar thereon to abut with the wall of the tank, substantially as described.

4. In a cheese-vat, the combination, with a water-tank provided with cross-bars in its bottom, of a milk-vat fitted to slide on the sides of the tank and provided on its bottom with downwardly-projecting hooks for engaging the cross-bars of the tank, substantially as described.

5. The combination, with the water-tank having a heating-pocket in the bottom and cross-bars extending across said pocket, of the detachable vat mounted upon the tank and hooks secured to the vat-bottom and adapted to engage the cross-bars, substantially as described.

LEOPOLD MEYER.

Witnesses:
FRANK KOHLBECK,
GUSTAV PUDEL.